No. 849,698. PATENTED APR. 9, 1907.
A. A. RADTKE.
ELECTRICAL INDICATING APPARATUS.
APPLICATION FILED OCT. 23, 1905.
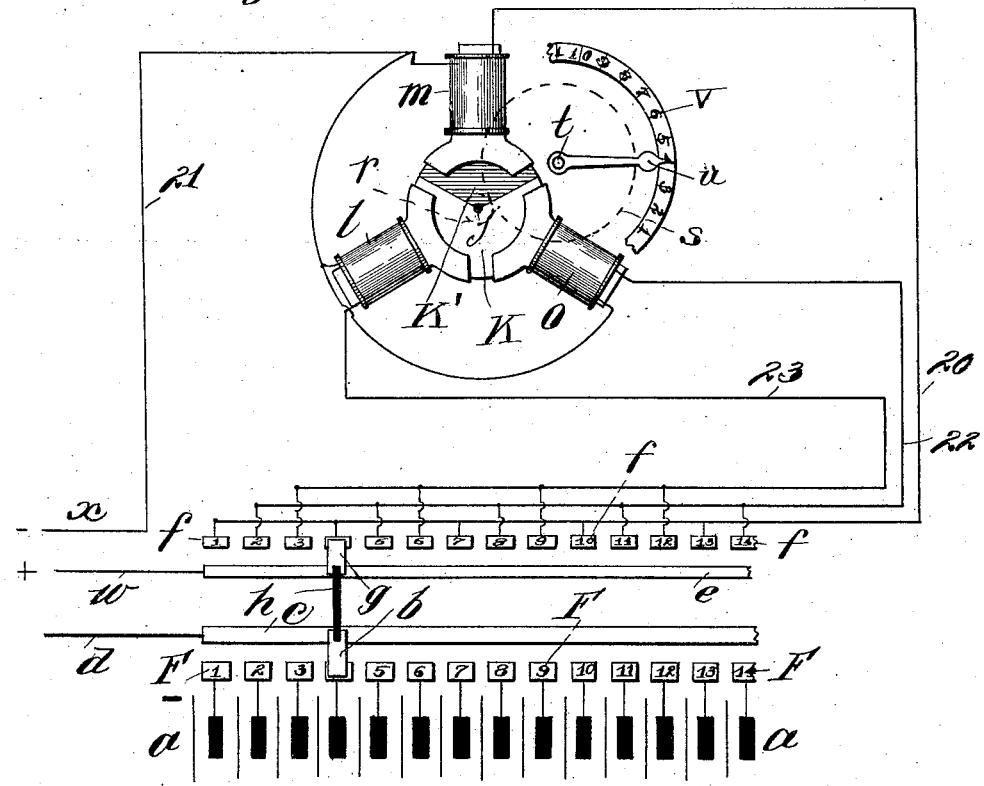
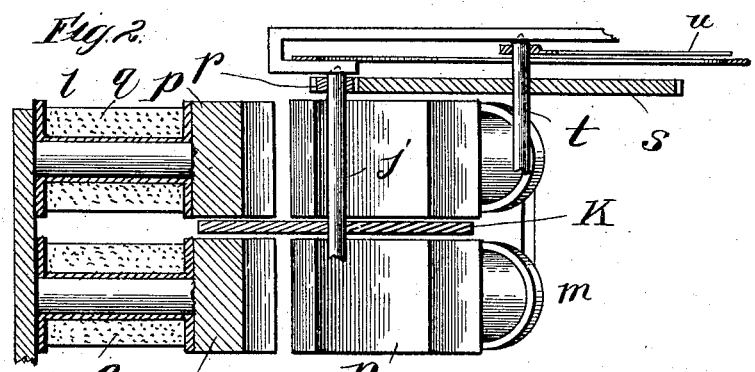
Witnesses:
Inventor
Albert A. Radtke,
By Charles A. Brown
Atty

UNITED STATES PATENT OFFICE.

ALBERT A. RADTKE, OF CHICAGO, ILLINOIS.

ELECTRICAL INDICATING APPARATUS.

No. 849,698.  Specification of Letters Patent.  Patented April 9, 1907.

Application filed October 23, 1905. Serial No. 283,891.

*To all whom it may concern:*

Be it known that I, ALBERT A. RADTKE, a citizen of the United States, residing at Chicago, in the county of Cook and State of Illinois, have invented a certain new and useful Improvement in Electrical Indicating Apparatus, of which the following is a full, clear, concise, and exact description, reference being had to the accompanying drawings, forming a part of this specification.

My invention relates to electrical indicating apparatus, and while useful for many purposes may be advantageously employed to indicate the position of what is known as an "end-cell switch," and I shall therefore describe my invention in this association.

The object of the invention, briefly stated, is to provide a simple and efficient means whereby the position and movements of an electrical switching device may be indicated at a distance, and this, too, by the employment of a minimum number of circuits.

The advantage of the indicator of my invention over those of the prior art may be illustrated in connection with indicators which have heretofore been used in the operation of storage batteries.

As is well known in the art, it is generally desirable to locate a storage battery at a considerable distance from the switchboard which is used to control the electrical system associated with the storage battery. When storage batteries are used in connection with electrical-distribution systems, it is customary to arrange them so as to float on the system. By varying the number of cells connected across the distributing-mains it is possible to charge or discharge the battery at will, and in regulating the number of cells connected across the system the end-cell switch is employed. It has heretofore been the practice to mechanically connect an auxiliary switch-arm with the main member of an end-cell switch, so that the movements of the main switch and the auxiliary switch shall be alike. Then for each contact of the main switch there is an auxiliary contact connected with a circuit leading from the end-cell switch to the switchboard, and at the switchboard each circuit is connected through a self-restoring annunciator-drop. The auxiliary switch serves to close a circuit through one drop at a time, and the drop which is thrown thus serves to indicate the position of the main switch. One of the principal objections to this form of an indicating device is the multiplicity of circuits which it is necessary to run between the end-cell switch and the switchboard where the drops are located. Furthermore, the duplication of the drops for each contact of the end-cell switch involves a very considerable expense. My invention, by means of which these objections are overcome, will be clearly understood by reference to the accompanying drawings, in which—

Figure 1 is a diagrammatic view of the apparatus employed, and Fig. 2 is a cross-sectional view of the indicator proper.

Similar reference characters are applied to like parts in both figures.

In Fig. 1 the end cells of a storage battery are shown at $a\ a$. Each cell is connected with one of the main contacts F F of the end-cell switch, the contacts being numbered consecutively. The main switch-blade $b$ serves to connect the numbered contacts with a bus-bar $c$, the bus-bar being connected with the distribution system by means of the lead $d$. The positive terminal of the storage battery is not shown; but this also may be assumed to be connected by a similar lead with the other side of the system. In accordance with my invention a second bus-bar $e$ is arranged for connection with the contacts $f f$, which are numbered to correspond with the main contacts of the end-cell switch. This connection is established by means of the auxiliary switch-blade $g$, which is mechanically connected with the main switch-blade $b$ by means of the bar of insulating material $h$.

The construction of the indicator shown in the upper part of Fig. 1 and in Fig. 2 is as follows: A disk K is rotatably mounted by means of the pivoted shaft $j$. The disk K is of brass or other non-magnetic material, except for the sector K′, which is of iron. Arranged around the disk there are three electromagnets $l, m,$ and $o$. The pole-pieces $p$ of these magnets are arranged as shown, so that the energization of any of the electromagnets by means of current traversing its coils $q\ q$ will cause the attraction of the iron sector of the disk, thus causing the disk to swing into such a position that the iron sector will occupy the space between the pole-pieces of the energized magnet. The shaft $j$ is provided with a small pinion $r$, meshing with the gear $s$, which is rotatably mounted with the shaft $t$. The pointer $u$ is also mounted upon this shaft. A dial is mounted below the pointer, so that the position of the pointer will be indicated by the numerals "V" upon the dial.

The operation of the device may be described as follows: Assuming the end-cell switch to occupy the position shown, where the blade $b$ connects contact 4 with the bus-bar $c$, the auxiliary switch-blade $g$ will occupy a corresponding position upon the auxiliary series of switch-contacts connecting the bus-bar $e$ with the auxiliary contact 4. Current, therefore, may be traced from the positive lead $w$ through the bus-bar $e$, the auxiliary switch-blade $g$, auxiliary contact 4, and thence through the wire 20 to the electromagnet $m$, and after passing through its coil thence by way of the wire 21 to the negative lead $x$. Current traversing the electromagnet $m$ will cause its energization, thus causing the attraction of the iron sector $K'$ into a position between the poles of the magnet $m$. The adjustment of the gearing is such that the pointer $u$ will at this time point to the numeral "4" upon the dial, thus indicating the position of the end-cell switch in connection with main contact 4. The movement of the end-cell switch to the right will cause the connection of the switch-blade $b$ with the main contact 5 and at the same time cause the connection of the auxiliary switch-blade $g$ with the auxiliary contact 5, thus completing a circuit by way of the wire 22 through the electromagnet $o$ and thence by way of the wire 21 to the negative lead $x$, whereupon the energization of the electromagnet $o$ will cause the attraction of the iron sector $K'$ of the disk into a position between the pole-pieces of the magnet $o$, and thereby rotating the disk, which in turn will cause a rotation of the pointer into a position so as to indicate the numeral "5" upon the dial. The switch-blade $g$ is preferably made wide enough to span the space between two of the auxiliary contacts, so that in passing from one contact to another circuit is closed through one magnet before it is broken through another, the result being to cause the sector $K'$ to occupy an intermediate position between the two energized magnets, causing a corresponding movement and position of the pointer. This is an important requirement in an end-cell switch indicator, because it is essential to know at the switchboard when a cell is short-circuited by the end-cell switch. I may call attention to the difficulties which would arise if it were not for the closure of circuit through one of the magnets before the circuit through another magnet was opened. Thus, for example, if one electromagnet is deënergized before the circuit is closed through the next there will be intervals in which the sector $K'$ will be free from all magnetic attraction, and its free movement, due to momentum, will very readily throw the pointer out of step with respect to the switch. For example, a movement of the end-cell switch in one direction, and consequently a corresponding movement of the auxiliary switch with a sudden stop between two of the said contacts, would start the armature and pointer of the indicator in rotation, and upon the sudden deënergization of all the electromagnets, when the switch is stopped between the contacts, this rotation would be indefinitely continued. So, also, in the movement of the switch-blades a momentary closure of the circuit through one of the electromagnets might frequently occur, and the consequent sudden energization of one of the electromagnets when no other was energized would give to the armature an impulse likely to throw it out of step with the switch-blade; but in accordance with my invention the closure of the circuit through one electromagnet before the circuit is broken through another assures a constant magnetic control of the armature of the indicator, thus maintaining the pointer in step with the end-cell switch at all times. In like manner the movement of the switch into a position in connection with the contact 6 will cause the energization of the electromagnet $l$ by way of the wire 23, thus causing the attraction of the iron sector $K'$ into a position between pole-pieces of the magnet $l$ and causing the indication of the position of the end-cell switch upon the dial of the indicator.

It will be noted that only three wires are run from the auxiliary contacts to the electromagnets of the indicator and that each of the three wires is connected with every third one of the auxiliary contacts. As the auxiliary switch-blade $g$ is moved over the auxiliary contacts the disk will be caused to rotate in one direction or the other, depending upon the direction of the movement of the end-cell switch, and will come to rest in a position corresponding with the position in which the movement of the end-cell switch is stopped. The pointer above the dial, therefore, which may be located at the switchboard, serves at all times to indicate the position or movements of the end-cell switch. It will be apparent to those skilled in the art that more than three electromagnets may be arranged around the disk or other moving armature of iron, if so desired; but since three electromagnets and three wires are sufficient for carrying out my invention I prefer not to multiply the number.

While I have illustrated and described my invention in connection with the end-cell switch of a storage battery, and which, by the way, may be actuated either manually or automatically, it is apparent that my invention may be used for a great variety of purposes in which it is desired to indicate at a distance the movements or position of any part. Furthermore, I do not wish to limit myself to the precise arrangements herein set forth and described; but Having illustrated one modification of my invention, I claim as new and desire to secure by Letters Patent—

1. In a device of the class described the combination of a rotatably-mounted armature magnetically unsymmetrical with reference to the axis of rotation, a plurality of electromagnets arranged around the axis of rotation of said armature, a series of insulated switch-contacts, each electromagnet being connected to periodically-recurring contacts of said series, and a relatively movable switch member coöperating with said contacts to close an electric circuit through said magnets in succession upon the relative movement of the switch member, said switch member serving in its movement to close circuit through one electromagnet before opening circuit through another, there being a magnetic pole induced in said armature to correspond with each and every effective magnetic pole of said electromagnetic system.

2. In a device of the class described the combination of a rotatably-mounted armature magnetically unsymmetrical with reference to the axis of rotation, a plurality of electromagnets arranged around the axis of rotation of said armature, the armature being subject to magnetic attraction by said electromagnets by means of a magnetic pole induced in said armature to correspond with each and every effective magnetic pole of said electromagnetic system, a series of switch-contacts of which periodically-recurring contacts are connected with each of said electromagnets, a source of current for energizing said electromagnets, a switch-arm coöperating with said contacts to close electric circuits through said electromagnets, the width of said arm being sufficient to span the space between adjacent contacts, and an indicator controlled by the rotation of said armature.

3. In a device of the class described the combination of a rotatably-mounted armature magnetically unsymmetrical with reference to its axis of rotation, three electromagnets arranged around the axis of the armature, said armature being subject to magnetic attraction by said electromagnets by virtue of a magnetic pole induced in said armature to correspond with each and every effective magnetic pole in said electromagnets, a series of electrical contacts, each electromagnet being connected to periodically-recurring contacts of said series, a movable member, the position of which is to be indicated, and a switch-blade mechanically connected with said movable member and coöperating with said contacts to control the flow of current through said electromagnets, the switch-blade being of greater width than the space between adjacent contacts of said series.

4. In a device of the class described the combination of a rotatably-mounted non-polarized armature, said armature being magnetically unsymmetrical with respect to the axis of rotation, three electromagnets equidistantly spaced around the axis of rotation of said armature and each adapted upon energization to attract magnetically the associated armature by virtue of a magnetic pole induced in said armature to correspond with the attracting-pole of each of the energized electromagnets, a series of switch-contacts, an electrical connection between each electromagnet and every third contact of said series, a movable member the position of which is to be indicated, a switch-blade mechanically connected with said movable member and electrically associated with said contacts, said switch-blade having a width sufficient to span the space between adjacent contacts, and an indicating-pointer geared to said armature to indicate the degree of rotation thereof.

5. In combination, a storage battery, a movable end-cell switch for connecting the end cells of said battery in an electrical circuit, a rotatably-mounted armature magnetically unsymmetrical with reference to its axis of rotation, a plurality of electromagnets arranged to actuate said armature, a series of insulated switch-contacts, each electromagnet being connected to periodically-recurring contacts of said series, a relatively movable switch member mechanically connected with said movable end-cell switch and coöperating with said contacts to close electrical circuits through said magnets in succession upon the relative movement of said switch member, said switch member serving in its movements to close a circuit through one electromagnet before opening the circuit through another.

6. In combination, a storage battery, a series of main contacts connected with end cells of said battery, a main switch-blade coöperating with said main contacts to connect a greater or less number of the cells of said battery in circuit, a series of auxiliary switch-contacts, an auxiliary switch-blade mechanically connected with said main switch-blade whereby the movements of one will be accompanied by similar movements of the other, a rotatably-mounted non-polarized armature magnetically unsymmetrical with reference to the axis of rotation, three electromagnets equidistantly spaced from one another around the axis of rotation of said armature and adapted to act magnetically upon said armature, an electrical circuit connecting each electromagnet with every third contact of the auxiliary series, the auxiliary switch-blade serving in conjunction with said auxiliary contacts to control the flow of current through said electromagnets, an indicating-dial, and a pointer associated with said dial and geared to the rotatable armature.

7. In a device of the class described, the combination of a rotatably-mounted armature magnetically unsymmetrical with reference to its axis of rotation, a plurality of electromagnets arranged around the axis of rotation of said armature, a series of insulated switch-contacts, said electromagnets being suitably connected with said contacts, and a relatively movable switch member actuated with said contacts to close an electrical circuit through said magnets in succession upon the relative movement of said switch member, the movement of said armature being entirely independent of polarity relations between said armature and magnets.

8. In a device of the class described, the combination of a rotatably-mounted armature magnetically unsymmetrical with reference to its axis of rotation, a plurality of electromagnets arranged about the armature, a series of insulated switch-contacts, each electromagnet being connected to periodically-recurring contacts of said series, and a relatively movable switch member actuated with said contacts to close an electric circuit through said magnets in succession on the relative movement of said switch member, the movement of said armature being entirely independent of polarity relations between said armature and electromagnets.

9. In a device of the class described, the combination with a rotatably-mounted armature, of a plurality of electromagnets arranged around the axis of rotation of said armature, a series of insulated switch-contacts, each electromagnet being connected to periodically-recurring contacts of said series, and a relatively movable switch member associated with said contacts and adapted upon actuation to close an electric circuit through said magnets in succession, said switch member serving in its movement to close circuit through one electromagnet before opening circuit through another, said armature being unsymmetrical with reference to the axis of rotation and adapted to assume a different position corresponding with the independent energization of each electromagnet and an equal number of other positions corresponding with the simultaneous energization of any two of said electromagnets.

10. In a device of the class described the combination with a plurality of electromagnetic coils, of switching mechanism adapted to maintain an energization of said coils while causing a change in the energization of said coils, and a rotatably-mounted non-polarized armature subject to the magnetic influence of said coils, said armature having but one position of stable equilibrium due to any given energization of said coils.

11. In a device of the class described, the combination with a storage battery, of a series of main contacts connected with end cells of said battery, a main switch-blade cooperating with said main contacts to connect a greater or less number of said batteries in circuit, a series of auxiliary contacts, an auxiliary switch-blade mechanically connected with said main switch-blades, whereby the movements of one will be accompanied by the movements of the other, three electromagnets, equidistantly spaced around the circumference of a circle, an electrical circuit connecting each electromagnet with every third contact of the auxiliary series, the auxiliary switch-blade serving in conjunction with said auxiliary contacts to control the flow of current through said electromagnets, and in its movement to close the circuit through one electromagnet before opening the circuit through another, a rotatably-mounted, unpolarized armature magnetically unsymmetrical with the axis of rotation and adapted to assume distinctive positions indicative of the independent energization of any of said electromagnets or the simultaneous energization of any two of them, an indicating-dial and a pointer associated with said dial, and geared to the rotatable armature.

12. In combination a storage battery, a series of main contacts connected with end cells of said battery, a main switch-blade cooperating with said main contacts to connect a greater or less number of the cells of said battery in circuit, a series of auxiliary switch-contacts, an auxiliary switch-blade mechanically connected with said main switch-blade whereby the movements of one will be accompanied by similar movements of the other, a rotatably-mounted non-polarized armature magnetically unsymmetrical with reference to the axis of rotation, three electromagnets equidistantly spaced from one another around the axis of rotation of said armature and adapted to act magnetically upon said armature by virtue of a magnetic pole induced in said armature to correspond with each attracting magnetic pole which may be caused by the energization at any one time of said electromagnets, an electrical circuit connecting each electromagnet with every third contact of the auxiliary series, the auxiliary switch-blade serving in connection with said auxiliary contacts to control the flow of current through said electromagnets, an indicating-dial and a pointer connected to said dial and geared to the rotatable armature.

13. In a device of the class described the combination of a rotatably-mounted armature magnetically unsymmetrical with reference to its axis of rotation, a plurality of electromagnets arranged around the axis of rotation of said armature, and serving when energized to attract said armature by virtue of a pole induced in said armature to correspond with each and every magnetic pole simultaneously produced by the energization of said electromagnets, and switching mechanism serving to energize said electromagnets in succession.

In witness whereof I hereunto subscribe my name this 20th day of October, A. D. 1905.

ALBERT A. RADTKE.

Witnesses:
GEORGE E. HIGHAM,
ARTHUR H. BOETTCHER.